United States Patent [19]
Fukami et al.

[11] 4,205,218
[45] May 27, 1980

[54] COVERED ELECTRODE FOR ARC WELDING

[75] Inventors: Kousuke Fukami; Masanori Fujimoto, both of Ibaraki; Fumio Fujita, Osaka; Tsuneyuki Nagase, Takatsuki, all of Japan

[73] Assignees: Sumitomo Chemical Company, Limited, Osaka; Hayashibara Biochemical Laboratories, Inc., Okayama, both of Japan

[21] Appl. No.: 890,506

[22] Filed: Mar. 27, 1978

[30] Foreign Application Priority Data

Mar. 29, 1977 [JP] Japan .................................. 52-35725

[51] Int. Cl.$^2$ .......................................... B23K 35/365
[52] U.S. Cl. .................................. 219/145.23; 148/23; 148/24; 148/26; 219/146.1
[58] Field of Search ...................... 219/145.23, 146.1; 148/23, 24, 26; 195/31 P

[56] References Cited

U.S. PATENT DOCUMENTS

| | | | |
|---|---|---|---|
| 1,778,392 | 10/1930 | Kinkead | 219/145.23 X |
| 2,209,829 | 7/1940 | Rasmussen | 148/23 X |
| 2,745,771 | 5/1956 | Pease | 148/23 X |
| 2,993,407 | 4/1960 | Witt | 195/31 P |
| 3,108,020 | 10/1963 | Willigen | 148/24 X |
| 3,235,405 | 2/1966 | Quaas | 148/24 X |
| 3,372,057 | 3/1968 | Seifahrt | 148/26 X |
| 3,856,625 | 12/1974 | Imrie | 195/31 P |

*Primary Examiner*—Richard R. Kucia
*Attorney, Agent, or Firm*—Stevens, Davis, Miller & Mosher

[57] ABSTRACT

A covered electrode for arc welding is disclosed which exhibits tight adhesion between the cover material and the core wire and provides good arc stability. This covered electrode comprises a core wire coated with a coating composition comprising (a) a powdered mixture of an inorganic oxide, carbonate and fluoride, (b) an alkali silicate and (c) 0.001 to 5.0% by weight of pullulan based on the alkali silicate.

2 Claims, No Drawings

COVERED ELECTRODE FOR ARC WELDING

This invention relates to a covered electrode for arc welding. More particularly, it relates to a covered electrode having pullulan incorporated in its coating composition which is excellent in welding performance and to a method for manufacturing same.

Covered electrodes have been customarily manufactured by pressure-coating a coating composition containing particulate inorganic matter around a core wire of mild steel or special steel by means of a coating machine and then drying the coating composition. The coating composition may be prepared by kneading a particulate inorganic matter comprising an inorganic oxide (e.g. potassium silicate, sodium silicate), a fluoride (e.g. calcium fluoride) and a carbonate (e.g. calcium carbonate) and 90-140 ml per kg of the said particular inorganic matter of a binder consisting substantially of 30-50% aqueous solution of an alkali silicate such as potassium silicate or sodium silicate (hereinafter referred to as water glass).

In applying the coating composition, water glass serves not only as a binder to render the particulate inorganic matter to stick to the core wire but also as a lubricant to assist the particulate inorganic matter to flow smoothly during coating. With the increase in incorporated amount of water glass, the fluidity of the coating composition increases, but the quality of the covered electrode is adversely affected to a great extent. Therefore, it is difficult to control the flow property of the coating composition by the amount of water glass alone. This is a reason for inferior workability of the coating composition which affects adversely the productivity for the covered electrode.

Further, the coating composition must be dried after having been pressure-coated on the core wire. In conventional manufacturing methods, since the coating composition contains a large amount of water after having been applied, a colloidal film of water glass gel will be formed in a thin layer over the surface on evaporation of water. Owing to this colloidal film, free diffusion of water within the coating layer is hinderd, creating a large difference in water content between the surface layer and the bulk of the coating layer. Owing to such a difference in water content together with the effect of linear expansion of the core wire, there will be produced an internal strain due to different shrinkage between the surface layer and the remaining part, thus giving rise to cracks in the coating layer on drying, leading, in turn, to local falling-off of the coating during welding operation. The local falling-off of the coating will cause disturbance of the uniformity of the instantaneous metallurgical reaction between the molten core wire and the molten parent steel, resulting in deterioration of the quality of deposited metal. Such a defective electrode exerts also deleterious influences on stability as well as concentricity of the arc and, hence, on welding efficiency.

To prevent the above phenomenon, it has been customary to begin the drying with natural drying for 2 or 3 days after application of the coating composition until the water content is reduced to 4 to 5% and then followed by drying under application of heat. Such a procedure, however, has disadvantages of prolonged drying time and large drying space.

In order to improve the above-noted disadvantages, it has been proposed to add to the coating composition sodium alginate, sodium carboxymethylcellulose, polyvinyl alcohol or the like together with water glass. Although some improvement in fluidity of the coating composition is achieved, the proposed method is not satisfactory for the purpose. Moreover, since an alginate or sodium methylcellulose is in the form of sodium salt, sodium carbonate is formed on subsequent baking and combustion of the electrode and remains in the coating layer. The presence of sodium carbonate increases hygroscopicity of the covered electrode, resulting in a decrease in bonding strength between the core wire and the coating layer, and causing falling-off of the latter during welding operation. Further, in order to manifest sufficient effectiveness, sodium alginate, sodium carboxymethylcellulose or polyvinyl alcohol must be added in relatively large quantities and so tends to remain as an organic matter in the covered electrode after baking. The residual organic matter causes contamination of the welded metal with a carbonaceous component which deteriorates the welding quality. In short, the incorporation of sodium alginate, sodium carboxymethylcellulose or polyvinyl alcohol in coating composition is not satisfactory in improving the performance characteristics of a covered electrode, though some degree of improvement in fluidity of the coating composition can be achieved.

The present inventors made efforts to solve the aforementioned problems of the covered electrode and, as a result, found that a covered electrode having good performance characteristics can be obtained by incorporating pullulan in the coating composition. Based on this finding, the present invention has been accomplished.

An object of this invention is to provide a covered electrode for arc welding coated with a coating composition comprising pullulan.

A further object of this invention is to provide a covered electrode which is excellent in welding efficiency and does not tend to deteriorate the quality of the welded metal.

Other objects and advantages of this invention will become apparent from the following description.

As described in the foregoing, the present invention is based on the discovered fact that by the addition of pullulan, the coating composition for a covered electrode is markedly improved in its flow property and in its resistance to cracking even when subjected to rapid drying and yields an excellent covered electrode with a high welding efficiency which will not cause deterioration in the quality of the welded metal. According to this invention, therefore, improvement in the productivity for a covered electrode and improvement in the quality of the covered electrode are simultaneously accomplished.

Pullulan herein used is a water-soluble high molecular weight polysaccharide in which recurring units of maltotriose, which is a trimer of glucose, are linked to one another through $\alpha$-1,6 linkages which are quite different from the linkages in maltotriose.

The molecular weight of pullulan used in this invention has no particular limitation, but is generally from $1 \times 10^3$ to $1 \times 10^6$, preferably from $5 \times 10^4$ to $5 \times 10^5$.

In this invention, pullulan is added in an amount of 0.001 to 5.0%, preferably 0.01 to 3.0%, by weight based on the water glass in the coating composition. The water glass containing said amount of pullulan may be used in substantially the same manner as a conventional water glass for the production of a covered electrode.

By the addition of such a small amount, fluidity of the coating composition is markedly improved and a strong bonding between the core wire and the coating composition of a finished covered electrode is achieved. Pullulan has advantages in that since the added amount is small, little organic matter remains in the covered electrode on baking and, hence, the amount of carbonaceous matter contaminating the welded metal is small and that because of being a neutral polysaccharide, no sodium carbonate is present in the electrode, resulting in reduced hygroscopicity, as contrasted to the case of sodium alginate or sodium carboxymethylcellulose.

Because of its high solubility in water and low viscosity of its solution, pullulan can be dissolved in a small quantity of water and easily milled into the coating composition. Consequently, the coating composition containing a small amount of water can be formed into a covered electrode and the bonding strength between the core wire and the coating layer is large. Accordingly, the resulting covered electrode withstands forced drying to a certain extent, resulting in saving of the drying time. The coating composition containing pullulan is subject to no cracking even when subjected to pre-drying at 100° C. for several hours after having been formed into a covered electrode.

As described above, according to this invention, by the addition of a small quantity of pullulan as binder in addition to water glass, fluidity of the coating composition is markedly improved and, hence, the productivity for the covered electrode is greatly increased. Since the coating composition incorporated with pullulan withstands cracking on forced drying and has reduced hygroscopicity, there is obtained a covered electrode which is subject to little falling-off of the coating layer during welding operation and which is excellent in stability and concentricity of the arc.

Pullulan used in this invention is subjected to no particular restriction with respect to the method of its production. It is isolated as an extracellular mucous substance by the culture of a strain of the genus *pullularia* now classified under Deuteromycetes (cf., for example, U.S. Pat. No. 3,827,937). It is also obtained in purified form by centrifuging the fermentation broth to remove the cell and precipitating with an alcohol such as methanol (cf., for example, U.S. Pat. No. 3,827,937).

Pullulan varies to some degree in physical properties according to the pullulan producing strain. However, any pullulan can be used.

Pullulan used in this invention can be modified by esterification, etherification, oxidation, amination, phosphorylation or the like. It is possible to change the property of pullulan over a wide solubility range of from water-soluble to water-insoluble by selecting the proper type and degree of modification. The term "pullulan", as used herein, includes not only pullulan but also water-soluble modifications.

In this invention, it is possible to use jointly with pullulan other water-soluble polymers such as sodium alginate, sodium carboxymethylcellulose, hydroxyethylcellulose, dextrin, starch, carboxyalkylstarch, polyethylene oxide, polyvinyl alcohol, polyvinylpyrrolidone, sodium polyacrylate and the like so long as the characteristics of pullulan are not lost. The amount to be used of other water-soluble polymers is generally 0.1 to 50% by weight based on pullulan.

It is also possible to add to the composition an insolubilizing agent for pullulan. Insolubilizing agents generally known as gelling agents or crosslinking agents for hydroxyl-containing polymeric substances are used. Examples of suitable insolubilizing agents include glyoxal, water-soluble epoxy compounds and dialdehyde starch. The amount to be used of an insolubilizing agent is 0.1 to 20% by weight based on pullulan.

Mixing of the particulate inorganic substance and the binder can be performed by means of customary equipments and procedures. Pullulan and water glass may be added as a mixture or separately at the same time or in any order. When plasticizers for pullulan such as ethylene glycol, propylene glycol, butylene glycol, glycerol and other polyhydric alcohols are present in an amount of 0.1 to 20% by weight based on pullulan, the mixing and dispersion of a particulate inorganic substance in the mixture of pullulan and water glass are greatly facilitated and a uniform dispersion is obtained in a shorter time of mixing.

The invention is illustrated below in detail with reference to Examples, but the invention is not limited thereto.

EXAMPLE 1

A powdered coating mixture (50μ to 200μ in particle diameter) comprising 30% of limestone, 45% of rutile, 5% of silica sand and 30% of calcium fluoride was thoroughly blended in a V-type mixer. To 100 parts of the mixture, were added 0.03 part of each additive shown in Table 1 and 20 parts of a 60% aqueous solution of water glass. After thorough mixing, the resulting coating composition was pressure-coated on the core wire and the fluidity of the composition in coating operation and the tightness of adhesion to the core wire were compared with one another.

Table 1

| Run No. | Additive | Fluidity | Tightness of adhesion |
|---|---|---|---|
| 1 | Water glass alone | Poor | Poor |
| 2 | Water glass + pullulan (mol. wt., 10,000) | Excellent | Excellent |
| 3 | Water glass + pullulan (mol. wt., 100,000) | " | " |
| 4 | Water glass + acetylpullulan (substitution degree, 0.2; mol. wt. of pullulan, 100,000) | " | " |
| 5 | Water glass + hydroxypropylpullulan (substitution degree, 0.1; mol. wt. of pullulan, 100,000) | " | " |
| 6 | Water glass + sodium alginate | Good | Good |
| 7 | Water glass + sodium carboxymethylcellulose | " | " |

Note:
Run Nos. 2 to 5 were carried out according to this invention.
Run Nos. 1, 6 and 7 are for comparison.

EXAMPLE 2

The coating compositions coated on the core wire obtained in Run Nos. 2 to 7 of the preceding Example were predried at 100° C. and then baked at 400° C. The usabilities of the resulting covered electrodes were as shown in Table 2.

Table 2

| Run No. | Composition of covered electrode | Cracking | Arc stability |
|---|---|---|---|
| 8 | Run No. 2 | No | Stable |
| 9 | 3 | " | " |
| 10 | 4 | " | " |

Table 2-continued

| Run No. | Composition of covered electrode | Cracking | Arc stability |
|---|---|---|---|
| 11 | 5 | " | " |
| 12 | 6 | Some | Unstable |
| 13 | 7 | " | " |

Note:
Run Nos. 8 to 11 were carried out according to this invention, while Run Nos. 12 and 13 were for comparison.

What is claimed is:

1. A covered electrode for arc welding comprising a core wire coated with a coating composition comprising (a) a powdered mixture of an inorganic oxide, carbonate and fluoride, (b) an alkali silicate and (c) 0.001 to 5.0% by weight of pullulan based on the alkali silicate.

2. A covered electrode according to claim 1, wherein molecular weight of the pullulan is $1 \times 10^3$ to $1 \times 10^6$.

* * * * *